C. F. KNOWLTON & F. F. ELLIOT.
MOLDING MACHINE.
APPLICATION FILED JULY 8, 1909.
1,094,723.
Patented Apr. 28, 1914.
3 SHEETS—SHEET 1.
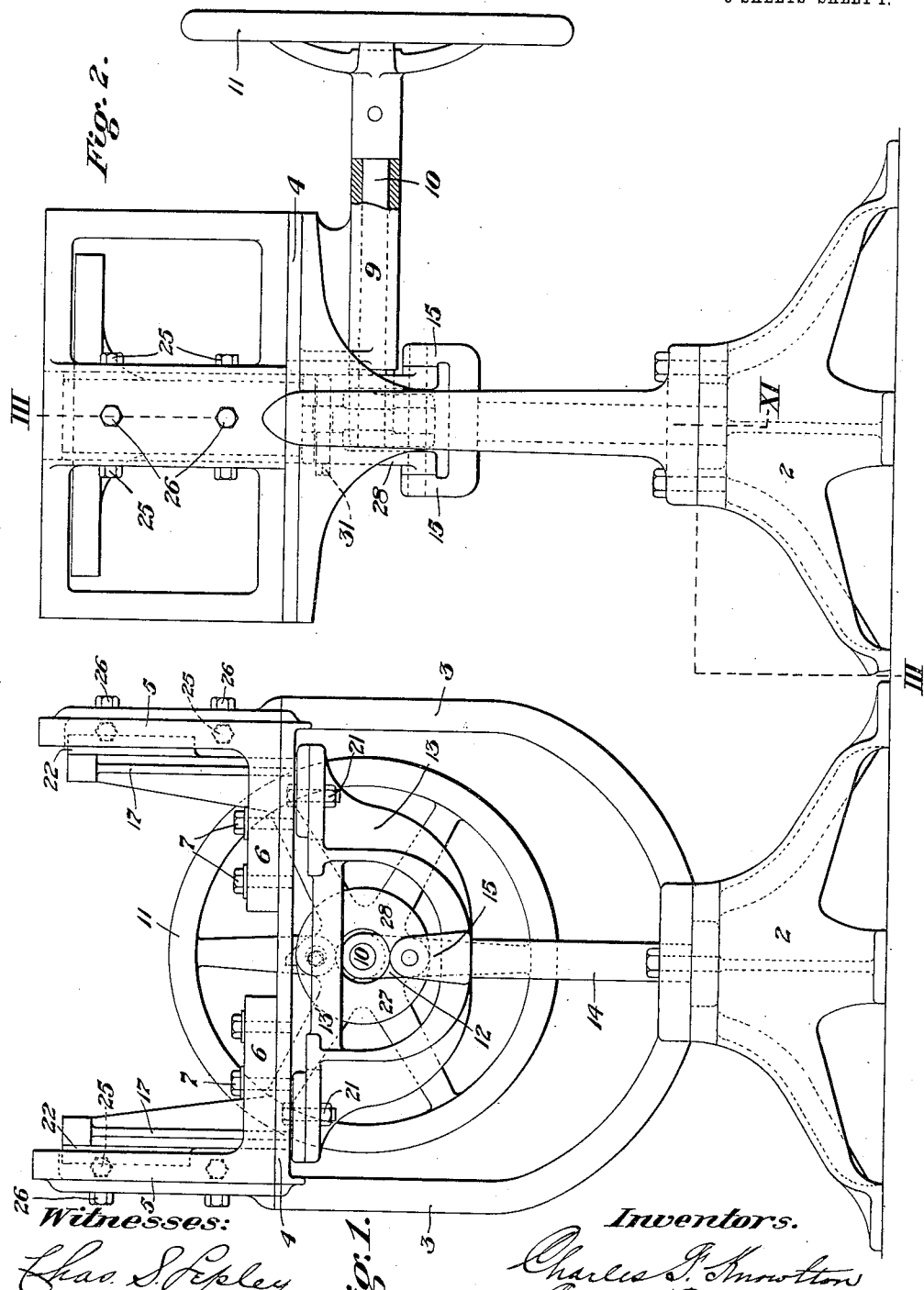

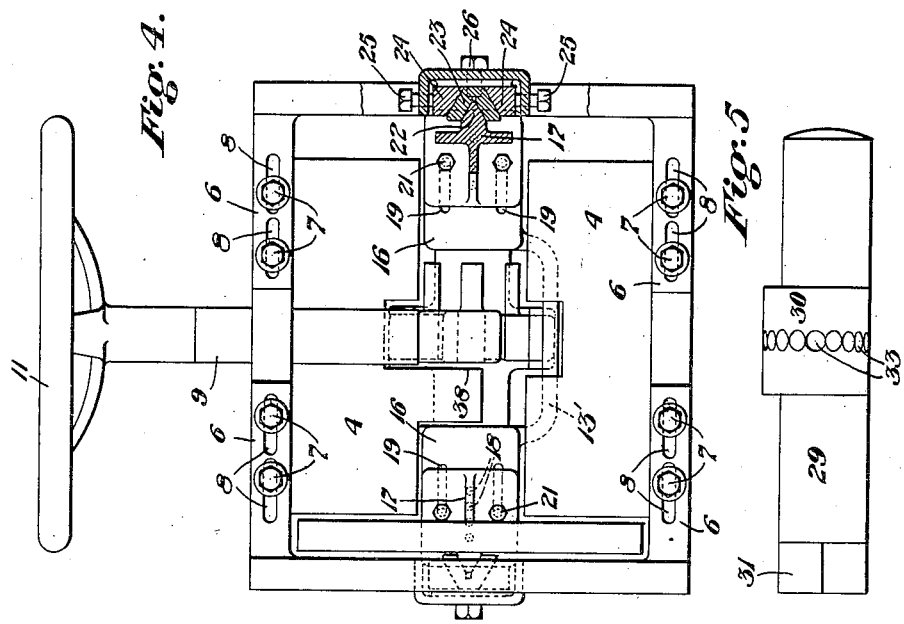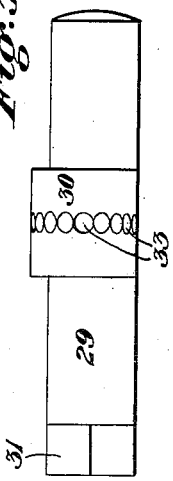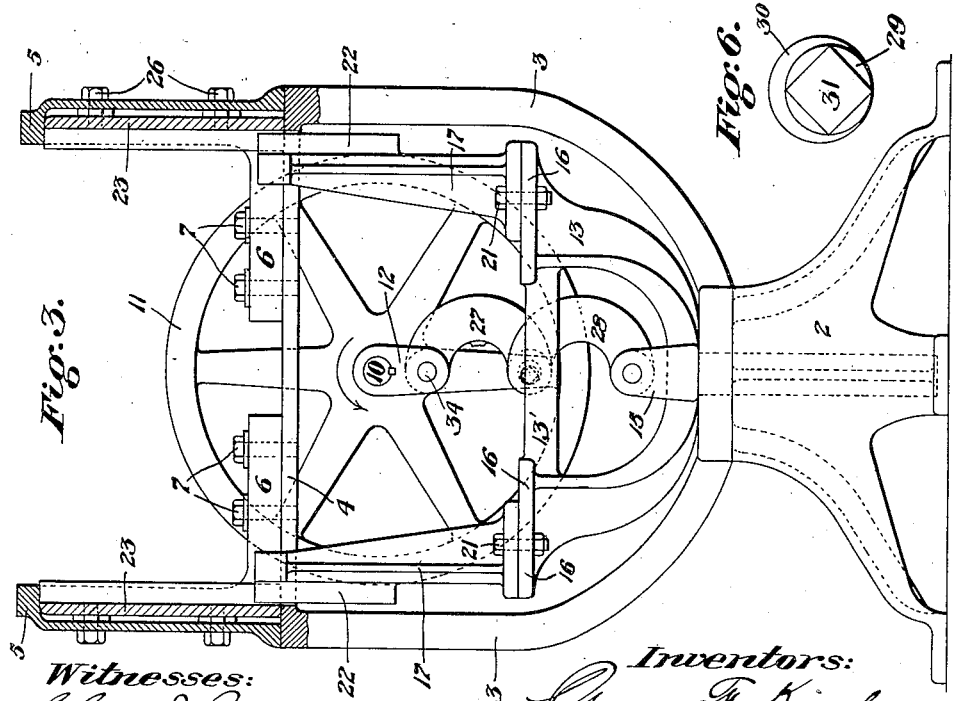

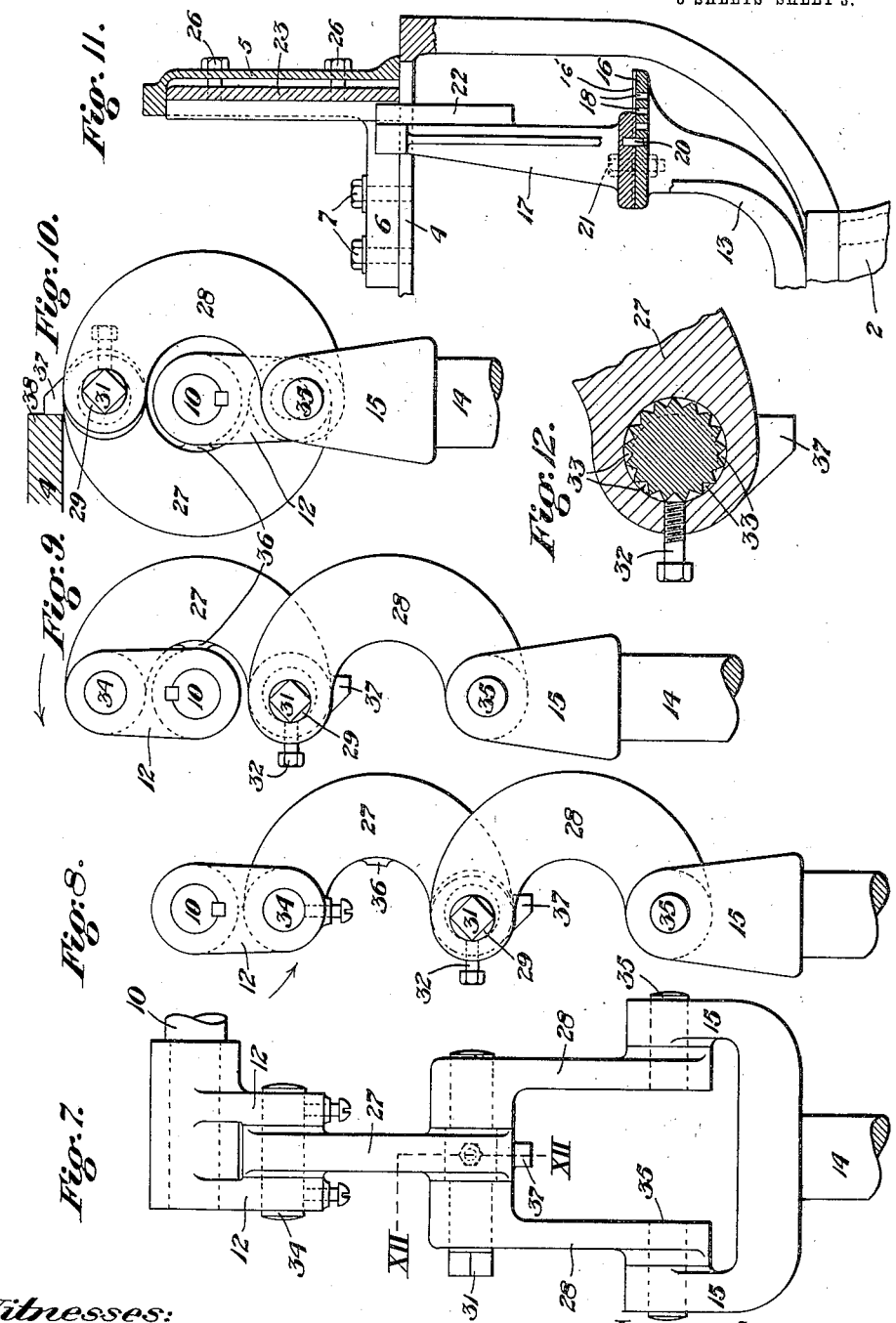

UNITED STATES PATENT OFFICE.

CHARLES F. KNOWLTON, OF ROSS TOWNSHIP, ALLEGHENY COUNTY, AND FRANK F. ELLIOT, OF PITTSBURGH, PENNSYLVANIA, ASSIGNORS TO THE OSBORN MANUFACTURING COMPANY, OF CLEVELAND, OHIO, A CORPORATION OF OHIO.

MOLDING-MACHINE.

1,094,723.   Specification of Letters Patent.   Patented Apr. 28, 1914.

Application filed July 3, 1909. Serial No. 506,514.

*To all whom it may concern:*

Be it known that we, CHARLES F. KNOWLTON and FRANK F. ELLIOT, citizens of the United States, residing at Ross township and Pittsburgh, respectively, in the county of Allegheny and State of Pennsylvania, have invented certain new and useful Improvements in Molding-Machines, of which the following is a specification, reference being had therein to the accompanying drawing.

Our invention consists of an improvement in molding machines, and it has for its object to provide a machine consisting of a flask-supporting frame and a pattern-carrying plunger operable therein, means for actuating the plunger, means for adjusting the frame and plunger arms for different sizes of flasks, means for compensating for inaccuracies in the parts to provide for the desired stroke, and other features of construction as shall be more fully hereinafter set forth.

The present invention utilizes means for effecting vertical movement of the pattern and its carrier for the full length of the draw with a relatively shorter crank travel through operating means somewhat similar to those shown in our prior application filed March 30, 1909, Serial No. 486,812.

In the drawings: Figure 1 is a view of the machine in front elevation, showing the pattern carrier raised. Fig. 2 is a side view of Fig. 1. Fig. 3 is a vertical sectional view on the line III. III. of Fig. 2, showing the pattern carrier lowered. Fig. 4 is a plan view of the machine, partly in section. Figs. 5 and 6 are side and end views of the adjusting stud. Fig. 7 is an enlarged detail view of the operating link and lever mechanism for the pattern carrier, extended. Fig. 8 is a side view of Fig. 7. Fig. 9 is a view similar to Fig. 8, showing the crank rotated a one-half revolution, and the links correspondingly raised. Fig. 10 is a similar view showing the crank rotated an entire revolution, the links and pattern carrier frame being entirely raised and nested around the crank shaft. Fig. 11 is a sectional detail view of one side of the machine on the line III. XI. of Fig. 2 showing the pattern carrier lowered and the flask support and pattern support adjusted inwardly. Fig. 12 is a sectional view on the line XII. XII. enlarged of Fig. 7.

2 represents the pedestal or base of the machine, of any suitable form, having upwardly extending supporting frame members 3, 3, at each side, by which the upper stationary flask-supporting structure is carried upon a connecting table structure 4 extending across from one of said frames 3 to the other. Said table is flat upon its upper surface, which is preferably faced for mounting upon it the upwardly extending flask-supporting frames 5, 5, upon the upper edges of which is carried the flask. Said frames 5 are provided with inwardly extending bracket feet 6 mounted upon the back and front and end edges of the table 4 and secured thereon by bolts 7 extending downwardly through slots 8 and tapped into the table, by which means frames 5 may be set inwardly or outwardly exactly to the desired degree and there secured in position, as will be readily understood. Depending downwardly below the table is a bearing 9 in which is carried the operating shaft 10 having the hand wheel 11 at its outer end, and at its inner end the double-sided actuating crank 12 for operating the pattern-carrying frame. The pattern frame, which is slidingly mounted within the main flask-supporting frame, and constitutes the plunger of the machine, consists of a vertically reciprocating frame 13 having a downwardly extending central stem 14 operable in a guiding bearing in base 2, with upwardly extending lugs 15 for engagement by the operating link mechanism. The frame 13 is cut out at its middle portion, preferably connected by a strengthening cross bar 13', and is provided with flat faced upper base portions 16, 16, at each side, upon which, like frame 5 are mounted the inwardly and outwardly adjustable pattern carrier extensions or bracket frames 17, 17. The bases 16 are each provided with a guiding strip 16' and a series of dowel pin holes 18 at their central portion and slotted bolt openings 19 at each side thereof, frames 17 having dowel pins 20 fitting into holes 18 whereby the frames are positively set at the desired location, and secured by bolts 21 passing through openings of the base flanges of frames 17 and slotted openings 19. By this construction, the pattern carriers are located with relation to each other and the desired size of the pattern, similar to the flask supports 5, by which means the capacity of the machine is greatly enlarged over a machine having rigid supports, rendering a single machine capable of use with several sizes of flasks or patterns.

Frames 17 are provided at each outer side with a V-shaped guide 22 set within a V-shaped groove of a slide bearing 23, which in turn is mounted between adjustable bearing blocks 24 having tapered inner wedging faces bearing against correspondingly tapered faces of bearing 23 whereby it may be adjusted through set screws 25. Bearing 23 is also adjusted and held by set screws 26, and by this means it will be seen that the vertical alinement of the pattern carrier may be accurately provided for, and wear compensated, the bearings 23 being set forwardly or backwardly, or inwardly or outwardly, and there positively held. This is a feature of especial advantage in connection with the adjustability of the parts, rendering it possible to set them in or out together and providing for taking up of any wear.

The pattern carrier frame 13 and its upwardly extending adjustable pattern carrying brackets 17 are vertically reciprocated within the flask-supporting frame by the shaft 10 and its hand wheel 11 through crank 12 and links 27, 28. These links as shown, are of substantially semi-cylindrical form, pivoted together by adjusting stud or bolt 29, journaled in outer links 28, 28, by its shank portion, and by an eccentric or cam portion 30, in the end of middle intervening link 27.

Stud 29 is provided with a key extension 31 extending beyond link 28 at one or both sides for turning by a wrench or key, and is secured in place by a set screw 32 inserted by its point into one of a series of apertures 33 located around the eccentric 30. By this means it will be seen that the links 27, 28, may be accurately adjusted toward or from each other, thereby adjusting the other terminal connections of the links with relation to each other, so as to insure against variation in the pattern carrier with relation to the flask support, due to inaccuracies in finishing, etc., and insuring exact raising and lowering of the pattern as desired with relation to the flask. Outer terminal of link 27 is pivotally connected at 34 with the end of crank 12, which as shown is double-sided, while the terminals of links 28 are similarly connected at 35 between the upwardly extending lugs 15, 15, at the base of the frame 13 and at the upper end of the guide stem 14. Link 27 is provided with an inwardly extending lug 36 for bearing upon the hub of cranks 12 and at its other end with a similar lug 37 adapted to engage against the edge of table 4 as at 38 to limit further throw of the crank when the pattern is entirely raised.

The operation of the machine is as follows: The parts being adjusted with the usual parting board and the flask located upon supporting frame 5, and the pattern upon brackets 17, the plunger being in its lowermost position, rotation of shaft 10 in the direction of the arrow will raise the links during a half rotation of the crank to the position indicated in Fig. 9, link 27 by its semi-circular shape, assuming the position around the hub of cranks 12 and bearing thereagainst by the inwardly projecting lug 36, whereby it will annularly conform to and surround the center of shaft 10. Upon further rotation of the shaft and crank to the lowermost position,—link 27 now forming a portion of the crank in its assemblage therewith,—carries pivotal stud 29 around in the same manner, the twin links 28 assuming the position shown in Fig. 10 and raising the pattern carrier to the uppermost position by means of connection 35, as will be readily understood. In lowering the pattern carrier, it is simply necessary to reverse the rotation of cranks 12, whereupon it will be positively lowered to its original position, by the thrust of the crank and links, assisted by gravity. It will be observed that by the arrangement of the links 28 in pairs they embrace the cranks 12 when assembled, with ample clearance, and that the operation of the pattern carrier in its vertical travel is positively guided by stem 14 and by the slide bearings 22 within their adjustable guides 23. As shown in Fig. 4, the table 4 is cut out at its middle portion transversely for clearance of the frames 17 and the operating crank and link mechanism, whereby the pattern carrier is free to reciprocate without interference.

The adaptability of the machine for adjustment to different sizes of flasks and patterns is a feature of very considerable advantage in machines of this type, permitting it to be used with a number of flasks and patterns of different sizes, which otherwise would require a machine for each size, while the adjustability of the bearings between the flask-supporting frame and pattern carrier facilitate the successful and accurate operation of the machine.

It will be observed that by the combined lever and link mechanism the throw of the lever is multiplied, so that, having raised the pattern carrier to the full extent of the throw of the lever on one-half revolution, a further one-half revolution duplicates the same lifting operation, thereby doubling the capacity of the lever within the restricted space, which is also a feature of great advantage in machines of this type.

The advantages of a molding apparatus in which the pattern may be inserted within the flask for packing and then withdrawn for its full length by the compact actuating mechanism above described, will be readily appreciated by all those familiar with this class of machinery, and avoids the necessity of providing a space for operative mechanism, the length of travel of which is coextensive with that of the pattern.

The invention may be changed or varied in different details or features of construction, or its proportions may be so designed to suit varying conditions of use, but all such changes are to be considered as within the scope of the following claims.

What we claim is:—

1. A molding machine having a flask support provided with adjustable guideways, a reciprocable plunger, and laterally adjustable pattern supporting brackets mounted thereon having guides engaging said guideways.

2. A molding machine consisting of a supporting base and frame having a top, laterally adjustable flask-supporting brackets thereon provided with guideways, and a reciprocable plunger having pattern supporting brackets provided with guides engaging said guideways.

3. A molding machine consisting of a supporting base and frame having a top, laterally adjustable flask-supporting brackets thereon provided with guideways, and a reciprocable plunger having laterally adjustable pattern-supporting brackets provided with guides engaging said guideways.

4. A molding machine consisting of a supporting base and frame having a top, laterally adjustable flask-supporting brackets thereon provided with guideways, and a reciprocable plunger having pattern-supporting brackets engaging said guideways.

5. A molding machine consisting of a supporting base and frame having a top, laterally adjustable flask-supporting brackets thereon provided with adjustable guideways, and a reciprocable plunger having pattern-supporting brackets engaging said guideways.

6. In a molding machine, the combination of a base and frame, laterally adjustable flask-supporting brackets mounted on the frame provided with guideways, a vertically reciprocable plunger mounted within the frame having laterally adjustable pattern supports provided with guides engaging said guideways, and means for actuating the plunger.

7. In a molding machine, the combination of a base and frame, laterally adjustable flask-supporting brackets mounted on the frame, a vertically reciprocable plunger mounted within the frame having laterally adjustable pattern supports, means for guiding the plunger and pattern supports, and means for actuating the plunger.

8. In a molding machine, the combination of a base and frame, laterally adjustable flask-supporting brackets mounted on the frame having adjustable guideways, a vertically reciprocable plunger mounted within the frame having laterally adjustable pattern-supporting brackets provided with guides engaging said guideways, and means for actuating the plunger.

9. In a molding machine, the combination with a supporting base and a vertically reciprocable plunger provided with laterally adjustable pattern supports having guides, and means for reciprocating the plunger, of a frame extending upwardly from the base at each side of the plunger provided with laterally adjustable flask supports having adjustable guide-ways engaging the guides of the pattern supports.

10. In a molding machine, the combination with a supporting base and a vertically reciprocable plunger provided with laterally adjustable pattern supports having guides, and means for reciprocating the plunger, of a frame extending upwardly from the base at each side of the plunger provided with laterally adjustable flask supports having longitudinal guideways engaging the guides of the pattern supports and wedge-faced adjusting strips, and means for adjusting said strips and guideways, substantially as set forth.

11. In a molding machine, the combination with a frame provided with flask supports, of a vertically reciprocable pattern-supporting plunger, an operating shaft and crank mounted in bearings in the frame, and a plurality of semi-circular links connecting said crank with the plunger, substantially as set forth.

12. In a molding machine, the combination with a frame provided with flask supports, of a vertically reciprocable pattern-supporting plunger, an operating shaft and crank mounted in bearings in the frame, a plurality of semi-circular links connected at their outer ends with the crank and plunger respectively, and an adjusting pivoting stud connecting the inner ends of said links and provided with an eccentric adjusting bearing portion, substantially as set forth.

13. In a molding machine, the combination with a frame provided with flask supports, of a vertically reciprocable pattern-supporting plunger, an operating shaft and crank mounted in bearings in the frame, a plurality of semi-circular links connected at their outer ends with the crank and plunger respectively, an adjusting pivoting stud connecting the inner ends of said links and provided with an eccentric adjusting bearing portion, and means for adjusting and securing said stud, substantially as set forth.

14. In a molding machine, the combination with a frame provided with flask supports, of a vertically reciprocable pattern-supporting plunger, an operating shaft and crank mounted in bearings in the frame, and a plurality of semi-circular links connecting said crank with the plunger, one of said links having a hub bearing lug, substantially as set forth.

15. In a molding machine, the combination with a frame provided with flask supports, of a vertically reciprocable pattern-supporting plunger, an operating shaft and crank mounted in bearings in the frame, and a plurality of semi-circular links connecting said crank with the plunger, one of said links having a limiting abutment, substantially as set forth.

16. In a machine of the character described, the combination with a supporting frame and a one-piece wedge shaped guideway member therein having inner and outer inclined faces, of adjusting blocks engaging the guideway member, substantially as set forth.

17. In a machine of the character described, the combination with a supporting frame and a wedge shaped guideway member therein, of adjusting blocks engaging the guideway member, and a reciprocating element having an interfitting wedge-shaped guide, substantially as set forth.

18. In a machine of the character described, the combination with a laterally adjustable supporting frame and a one-piece wedge shaped guideway member therein having inner and outer inclined faces, of adjusting blocks engaging the guideway member, substantially as set forth.

In testimony whereof we affix our signatures in presence of two witnesses.

CHARLES F. KNOWLTON.
FRANK F. ELLIOT.

Witnesses:
C. M. CLARKE,
CHAS. S. LEPLEY.

---

Copies of this patent may be obtained for five cents each, by addressing the "Commissioner of Patents, Washington, D. C."